United States Patent [19]

Scott et al.

[11] Patent Number: 5,588,771

[45] Date of Patent: Dec. 31, 1996

[54] CONNECTOR FOR COUPLING A PAIR OF RODS

[75] Inventors: Gregory H. Scott, Salina; Melvin P. Kejr, Brookville, both of Kans.

[73] Assignee: Kejr Engineering, Inc., Salina, Kans.

[21] Appl. No.: 425,931

[22] Filed: Apr. 20, 1995

[51] Int. Cl.⁶ .................................................. F16B 7/22
[52] U.S. Cl. ........................................ 403/353; 403/102
[58] Field of Search ..................................... 403/102, 353

[56] References Cited

U.S. PATENT DOCUMENTS

| | | | |
|---|---|---|---|
| 534,507 | 2/1895 | Hoagland | 403/353 |
| 715,976 | 12/1902 | Carolan | 403/353 |
| 730,186 | 6/1903 | Case | 403/353 |
| 1,255,406 | 2/1918 | Gilbert | 403/353 |
| 1,736,373 | 11/1929 | Seeger | 403/353 |
| 6,186,263 | 2/1993 | Kejr et al. | 175/20 |

Primary Examiner—Anthony Knight
Attorney, Agent, or Firm—Shook, Hardy & Bacon L.L.P.

[57] ABSTRACT

A connector couples a pair of elongated rods in axial alignment for transmitting axial and rotational forces along a longitudinal axis of the rods through the connection. The connector includes interfitting male and female sections projecting in longitudinal extension from their corresponding respective rods, with the male section including an elongated transversely polygonal member having a transversely extending notch. The female section comprises an elongated channel having a cross-section configuration for complementarily receiving the male section for rotation with the latter and having a transversely extending segment configured to be received in the notch when the rods are in axial alignment to lock the rods together for axial movement as a unit. The female section also includes a pair of elongated apertures respectively positioned on opposite facing surfaces of the channel relative to the longitudinal axis. The apertures communicate the channel with the exterior of the female section and are positioned to permit the sections to be moved into or removed from their connected positions when the rods are disposed in positions with their respective longitudinal axes at an angle with respect to one another.

8 Claims, 2 Drawing Sheets

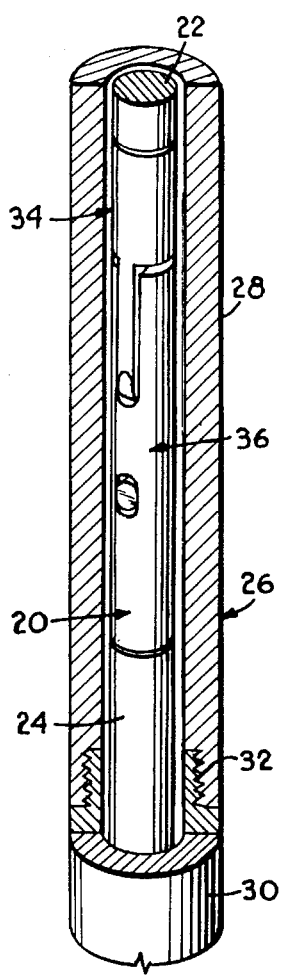
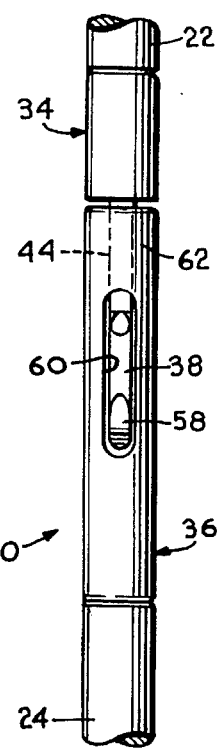
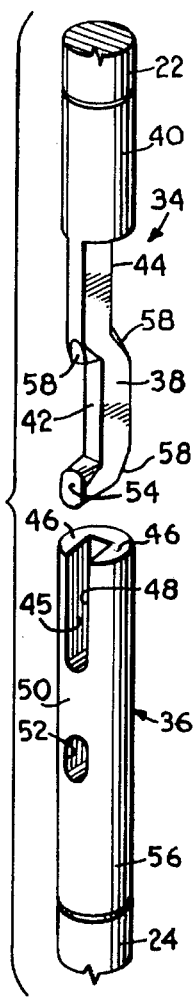
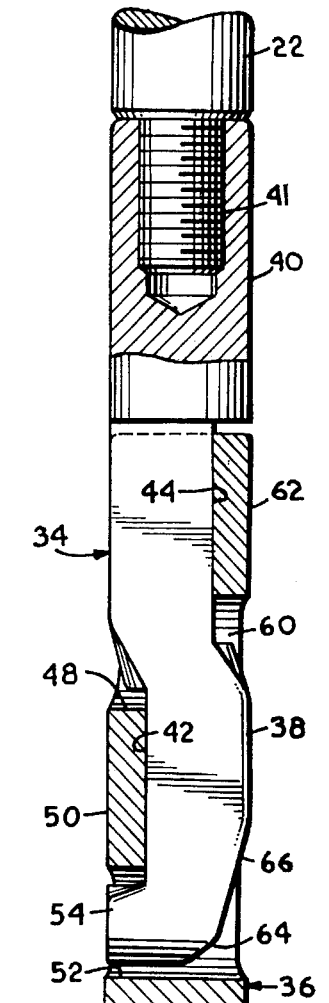
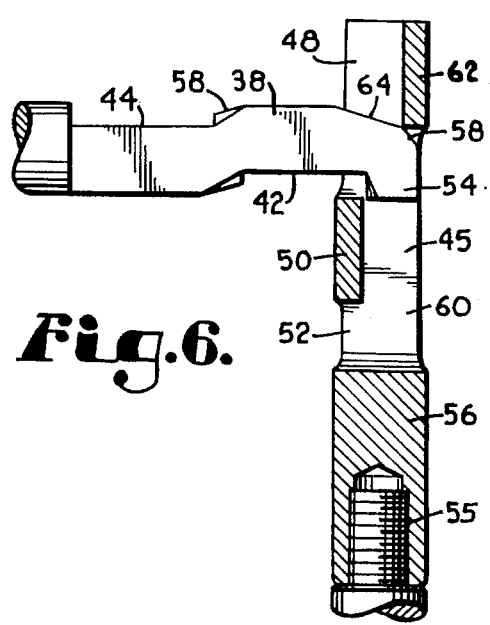

CONNECTOR FOR COUPLING A PAIR OF RODS

FIELD OF THE INVENTION

This invention relates to connectors, and more particularly, to connectors for coupling a pair of elongated rods.

BACKGROUND OF THE INVENTION

Recently, probing systems utilizing small diameter probes have been used increasingly for subsurface investigations. These probing systems typically utilize a percussion hammer to drive a probe into the ground. The probe is driven to a desired depth by utilizing one or a series of probe rod sections. A first probe rod section is attached to the probe and driven into the ground by applying percussive forces to the upper end of the rod section. After the rod section is driven into the ground, another rod section is connected to the exposed end of the first section and this second section is driven into the ground. Additional rod sections can be utilized in this manner until the probe is driven to a desired depth. The rod sections typically are connected together using a male/female thread arrangement. The upper end of a rod section has a male thread surface which mates with a female thread surface located on the lower end of the rod section above.

In some of the soil probing systems used currently, each rod section has a hollow bore formed along its entire length generally forming an elongated sample tube. The bores of the sample tube sections are in communication with each other when the tube sections are connected together. For example, one such soil probing system is described in U.S. Pat. No. 5,186,263 to Kejr. In that system, a sample tube is utilized with a releasably fixed piston tip which acts as a plug during driving. Rearward movement of the piston tip during driving is blocked with a removable piston stop. In operation, the sample tube is driven into the soil with the piston tip blocking its forward end. Additional sample tube extensions are successively added to the first sample tube to allow driving of the sample tube to the desired depth. At the desired depth, the piston stop is removed to unblock the piston tip. The sample tube with extensions are then driven forward while the piston tip remains at its position with respect to the soil, causing the soil sample to enter the tube. The entire device is then removed from the soil to recover the sample.

In this arrangement, the piston stop includes a piston rod extending rearwardly through the sample tube. The rearward end of the piston rod is received in a through hole in a drive head fixed to the rearward end of the sample tube. In those situations requiring extension tubes to drive the probe further into the ground, the piston stop is preferably a threaded member so that elongated extension rods can be inserted through the hollow probe extension tubes and used to unscrew and withdraw the piston stop at the appropriate time. When necessary, a series of extension rods are inserted through the extension tubes. Each of the extension rods is formed as an elongated cylinder having standard exterior threads at each end thereof. In order to maintain the extension rods in end-to-end relationship, a plurality of extension rod couplers are used. The rod couplers are formed as short hollow cylinders having standard interior threads corresponding to the threads on the extension rods. Thus, the extension rods are connected in series by threadedly engaging associated ends of successive extension rods with a portion of the length of one of the rod couplers.

A significant disadvantage of the above-described arrangement is the time and effort involved in assembling and disconnecting the various probe extension tubes and extension rods, particularly at increased sample depths. As noted above, the sample tubes typically use a male/female thread arrangement so that only one connection is required to couple two sample tubes. However, in order to assemble a pair of extension rods, two separate connections are required to adjoin the rods with the rod couplers. As is apparent, considerable time and effort is consumed by this process, since the extension rods must be threadedly connected to take the soil sample, and then disconnected as the device is removed from the ground. In addition to the time involved, field personnel often experience difficulty in disconnecting the extension rods and must sometimes use wrenches or other tools to complete the disconnection. Thus, a need has arisen to alleviate the foregoing difficulties involved in subsurface investigations.

SUMMARY OF THE INVENTION

Accordingly, it is a primary object of the present invention to provide a structure for connecting a pair of elongated rods that can be quickly and easily assembled and disassembled.

A further important object of this invention is to provide a connector that can transmit torque from one elongated rod to another about a longitudinal axis of the connected rods in both the clockwise and counterclockwise directions.

A related object of this invention is to provide a connector wherein the amount of torque applied to the connector does not affect the speed with which disassembly of the connector is accomplished.

Another important object of this invention is to provide a connector that transmits axial forces in either compression or tension along the longitudinal axis of the connected rods.

Still another object of the present invention is to provide a connector that will not unlatch without an operator's effort to disassemble the connector.

A further object of this invention is to provide a connector that is feasible to machine and cost-effective to produce.

These and other important aims and objectives are accomplished with the structure for connecting a pair of elongated rods according to the present invention. The connecting structure couples a pair of elongated rods in axial alignment for transmitting axial and rotational forces along a longitudinal axis of the rods through the connection. The structure includes interfitting male and female sections projecting in longitudinal extension from their corresponding respective rods, with the male section including an elongated transversely polygonal member having a transversely extending notch. The female section comprises an elongated channel having a cross-section configuration for complementally receiving the male section for rotation with the latter and having a transversely extending segment configured to be received in the notch when the rods are in axial alignment to lock the rods together for axial movement as a unit. The female section also includes a pair of elongated apertures respectively positioned on opposite facing surfaces of the channel relative to the longitudinal axis. The apertures communicate the channel with the exterior of the female section and are positioned to permit the sections to be moved into or removed from their connected positions when the rods are disposed in positions with their respective longitudinal axes at an angle with respect to one another.

BRIEF DESCRIPTION OF THE DRAWINGS

The various aspects of the invention are described in detail below, with reference to the drawings, in which:

FIG. 1 is a fragmentary perspective view of a connector for coupling a pair of elongated rods embodying the principles of the present invention shown in position in a sampling tube, parts being broken away and shown in cross-section to reveal details of construction;

FIG. 2 is an exploded perspective view of the connector of the present invention showing the male and female sections of the connector in a disassembled state;

FIG. 3 is a fragmentary front elevational view showing the connector of the present invention in its assembled position;

FIG. 6 is a fragmentary, detailed cross-sectional view illustrating the initial step for assembling the connector of the present invention with the male and female sections intersecting at an angle;

FIG. 9 is a fragmentary, enlarged detailed cross-sectional view showing the connector in its fully assembled position, parts being broken away to reveal details of construction.

DETAILED DESCRIPTION OF THE PREFERRED EMBODIMENT

Figure 7:
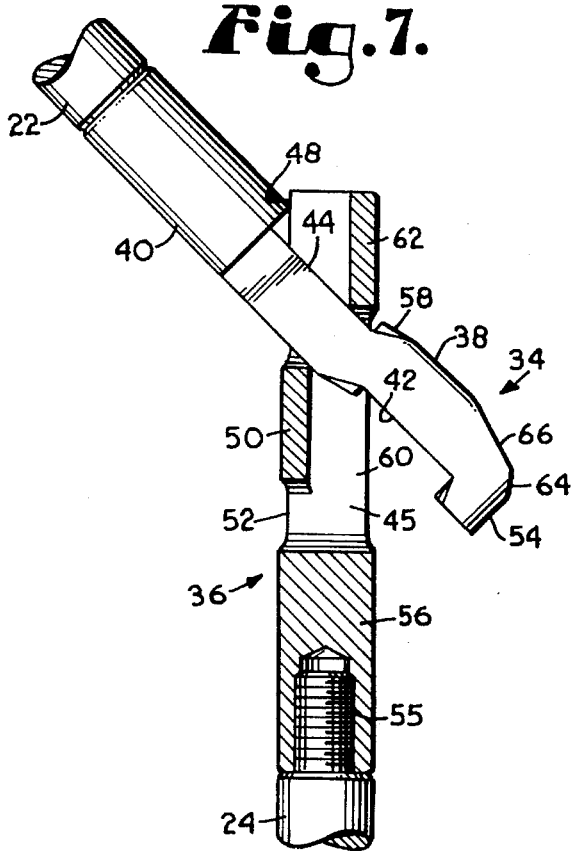
FIG. 7 is a view similar to FIG. 6 but showing a further step for assembling the connector with the male and female sections at a reduced angle with respect to one another.

A connector for coupling a pair of elongated rods is broadly designated in the drawings by the reference numeral 20. In the illustrated embodiment, connector 20 is shown for use in a soil probing system of the kind described above. More particularly, connector 20 is constructed to couple together a pair of elongated extension rods 22 and 24 which are used to release a piston stop (not shown) in a sample probe 26 for obtaining soil or other subterranean samples. Connector 20, as well as the other rods and probes of sample probe 26, preferably are made of high strength alloy steel. Sample probe 26 includes two elongated tubular sample tubes 28 and 30 connected together via mated threads 32. Depending on the desired depth of a particular sample to be obtained, however, a series of sample tubes can be threadedly connected, thereby requiring a series of elongated extension rods coupled together with connectors 20 of the present invention. While the present invention is described herein for use in a soil probing system, it should be understood and appreciated that connector 20 can be used advantageously in other applications requiring the connection of two separate members.

In accordance with the present invention, connector 20 couples the pair of elongated rods 22 and 24 with interfitting sections comprised of a male connector section 34 and a female connector section 36. Male and female interfitting sections 34 and 36 are configured to project in longitudinal extension from the corresponding respective elongated rods 22 and 24 to which they are attached. As explained in further detail below, male and female connector sections 34 and 36 are adapted to complementally engage one another such that the respective rods are in axial alignment to lock rods 22 and 24 together for axial movement as a unit.

An important aspect of the present invention is the ability of connector 20 to transmit axial and rotational forces from one elongated rod to another. Specifically, connector 20 is advantageously constructed to transmit axial forces both in compression and in tension. Thus, in the illustrated embodiment, connector 20 transmits compressive forces when the probing system is driven into the ground, and tensile forces when the probing system is removed from the ground. Additionally, the present construction transmits torque about the longitudinal axis of rods 22 and 24 in both the clockwise and counterclockwise directions when the rods are axially aligned. In that regard, because of the unique interfitting relationship of male and female sections 34 and 36, the amount of torque applied to extension rods 22 and 24 and to the connection does not affect the ease with which connector 20 is disassembled as can be the case with standard threaded rod couplers.

A further advantage of connector 20 as shown in the illustrated embodiment is that connector 20 has substantially the same transverse dimension as elongated rods 22 and 24. This is in contrast to the tubular, internally threaded rod couplers which telescope over the extension rods and thus necessarily have a greater transverse dimension than the extension rods that they connect. As a result, the connector of the present invention may be used in relatively small diameter sampling tubes which is often desired.

FIG. 2 illustrates interfitting male and female connector sections 34 and 36 in further detail. As can be seen in the drawing, male section 34 includes an elongated, transversely polygonal member, preferably in the form of an elongated, transversely rectangular bar 38. Elongated bar 38 is integral with a base portion 40 which is constructed to be attached to elongated extension rod 22. Base portion 40 can include a cavity extending to a selected depth within the base portion having standard interior threads 41 for threadedly receiving elongated rod 22. Under this arrangement, threads 41 preferably are right-handed and the threads for connecting the piston stop of sample tube 26 are left-handed. As such, when the threads of the extension rod and piston stop have been fully engaged by right-handed turning, continued right-handed turning will eventually disengage the threaded connection of the piston stop. Alternatively, elongated rod 22 could be welded to base portion 40 or the two could be formed as a unitary construction such that elongated rod 22 and male section 34 form an integral unit. Such an integral construction advantageously transmits torque through connector 20 in both the clockwise and counterclockwise directions.

Referring in more detail to elongated bar 38 of the illustrated embodiment, bar 38 has a first transversely extending notch 42 and a second transversely extending notch 44. As can be seen in FIGS. 2 and 6–9, notch 44 is disposed on an opposite side of bar 38 from notch 42 and is longitudinally offset from notch 42 and positioned adjacent base portion 40. As described below, notches 42 and 44 are adapted to engage with female section 34 in an interfitting relationship to lock the elongated rods in axial alignment.

Figure 5:
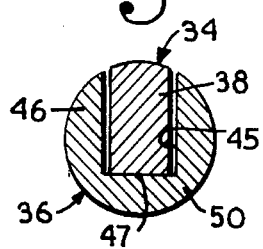
FIG. 5 is a detailed cross-sectional view taken generally along line 5—5 of FIG. 4.

Female section 36 of connector 20 is formed with an elongated channel 45 having a cross-section configuration for complementally receiving male section 34. The elongated chamber 45 of female section 36 is defined by a pair of spaced apart sidewalls 46 as best shown in FIG. 5. The spaced apart sidewalls 46 integrally extend to a floor 47 defining the lower surface of elongated channel 45. Channel 45 is preferably formed by a combination of drilling and milling operations on the steel material of section 36 to achieve the desired channel configuration.

A selected number of apertures in female section 36 communicate elongated channel 45 with the exterior of section 36. As shown in FIG. 2, female section 36 includes a first elongated aperture 48 extending from one end of section 36 to a transversely extending segment 50 of elongated chamber 45. In accordance with the invention, transversely extending segment 50 is configured to be received in notch 42 when elongated rods 22 and 24 are positioned in axial alignment such that the rods are locked together for the transmission of axial and rotational forces through connector 20.

Female section 36 also includes an opening 52 in elongated chamber 45 which is configured to receive a tip 54 of elongated bar 38 when male and female sections 34 and 36 are connected. Similar to male section 40, a base portion 54 is included as part of female section 36. Base portion 54 can optionally include a cavity extending to a selected depth having interior, preferably right-handed threads 55 for threadedly connecting extension rod 24 similar to threads 41 described above. Alternatively, base portion 54 could be welded to elongated rod 24 or formed as an integral unitary body such that rod 24 and female section 36 form an integral unit.

In order to provide clearance when male and female sections 34 and 36 are connected and disconnected, male section 34 includes a plurality of beveled regions 58 on select corners of elongated bar 38. While it is desirable to include the maximum amount of material feasible on the connector members to enhance strength, beveled regions 58 are provided to smooth out the rough corners or edges of elongated bar 38 that could otherwise catch against portions of female section 36 as male section 34 is moved into or removed from its connected position. Beveled regions 58 are adapted to provide ease of connection and disconnection since interfitting male and female sections 34 and 36 are preferably in close dimensional tolerance with one another.

In the illustrated embodiment, it can be seen that the beveled region 58 located nearest tip 54 of elongated bar 38 actually includes two beveled surfaces disposed at different angles. As shown in FIGS. 6-9, a forward beveled region 64 is disposed at the forward corner of elongated bar 38 and extends from the end of bar 38 to a second beveled region 66. Beveled region 64 is preferably configured at a steeper angle than beveled region 66 to ensure ease of connection and disconnection. This steeper beveled region 64 is particularly important for disconnection so that male section 34 can clear the constricted path of elongated channel 45 when the male section is removed from its connected position.

Female section 36 also includes a second elongated aperture 60 as shown in FIGS. 3 and 6-9. Elongated aperture 60 is longitudinally offset from first elongated aperture 48 of female section 36. Also, elongated aperture 60 is located on the opposite side of elongated chamber 45 from elongated aperture 48. In the illustrated embodiment, elongated aperture 60 extends from a position proximate base portion 56 to a second transversely extending segment 62 of elongated chamber 45. As can be seen, transversely extending segment 62 is positioned between one end of the female section 36 and the elongated aperture 60. Similar to segment 50, segment 62 is configured to engage with second transversely extending notch 44 of male section 34 when the elongated rods are positioned in axial alignment. In that position, notch 44 fits directly beneath segment 62. FIG. 3 illustrates how elongated bar 38 of male section 34 is received in the second elongated aperture 60 of section 36 when rods 22 and 24 are positioned in axial alignment.

The precise relative positioning of elongated apertures 48 and 60 of female section 36 as illustrated is advantageous for an elongated cylindrical rod structure of the type described. It is important that the elongated apertures be positioned to permit the male and female sections to be moved into or removed from their connected positions when the respective longitudinal axes of the rods are disposed at an angle with respect to one another. In other words, apertures 48 and 60 must be positioned to allow male section 34 to be inserted into and extend through female section 36 while at an angle, and then be moved to positions where the elongated rods are in axial alignment. This is best illustrated in FIGS. 6-8 as described in greater detail below.

Figure 4:
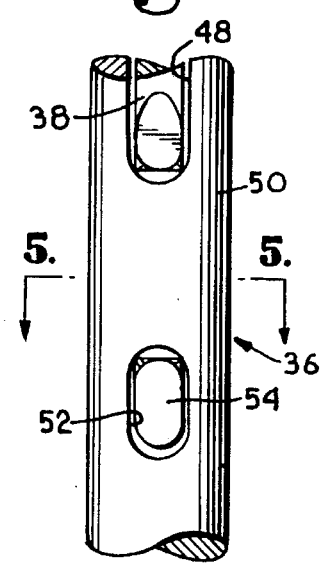
FIG. 4 is a fragmentary, enlarged rear elevational view of the connector of the present invention in its assembled position.

As mentioned above, an important feature of the present invention is the ability of connector 26 to transmit both axial and rotational forces between the elongated rods. The interfitting relationship of the mutually engaging notch/segment structure of male and female sections 34 and 36 provides this characteristic. As shown in FIG. 4, when male and female sections 34 and 36 are in their connected positions, transversely extending segment 50 is received in first notch 42 of elongated bar 38 such that the oppositely facing shoulders of notch 42 abut against segment 50 when axial forces are applied to the extension rods. As can be seen, tip 54 of elongated bar 38 is received in opening 52 while the portion of elongated bar 38 longitudinally adjacent notch 42 is received in first elongated aperture 48. By this construction, connector 20 of the present invention essentially forms a unitary body when the respective sections are in their connected positions and the elongated rods are in axial alignment as best illustrated in FIG. 5.

A particularly advantageous feature of the present invention is the quickness and ease with which connector 20 can be assembled and disassembled. This is a significant improvement over existing tubular, internally threaded rod couplers that often require considerable time and effort to assemble and disassemble. Additionally, connector 20 is configured so that it will not unlatch without an operator's effort. The operation for connecting male and female sections 34 and 36 is illustrated in FIGS. 6-8. Referring first to FIG. 6, male section 34 is shown intersecting female section 36 at a substantially 90° angle. In the preferred embodiment, the respective sections 34 and 36 must be placed in this substantially 90° intersecting position in order to assemble or disassemble the connection. As shown, tip 54 of male section 34 is slidably received in elongated aperture 48 of female section 36. Because of the relative positioning of transversely extending segments 50 and 62 of female section 36, only a narrow constricted path is provided for receiving male section 34. Moreover, while the respective sections 34 and 36 could be designed with precise relative dimensions so that no beveled regions 58 are required, in the preferred embodiment, beveled regions 58 are included on elongated bar 38 to ensure that sections 34 and 36 can be easily connected and disconnected.

Figure 8:
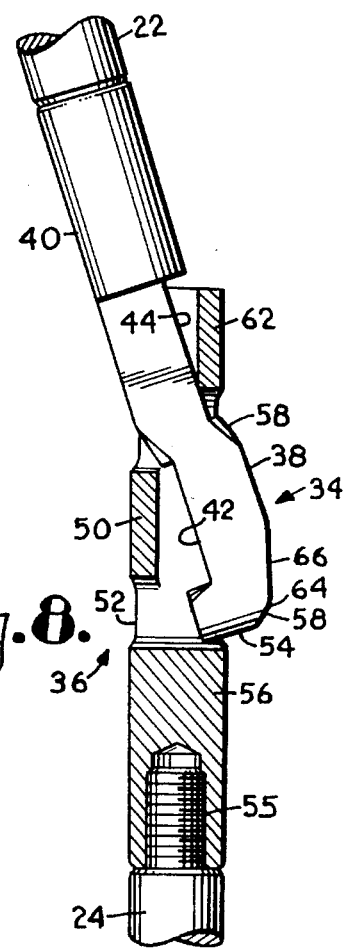
FIG. 8 is a view similar to FIG. 7 but showing the male and female sections of the connector nearing their fully assembled positions.

After male section 34 is placed in a substantially 90° angular position relative to female section 36, male section 34 is translated longitudinally into and positioned at a reduced angle with respect to female section 36 as illustrated in FIG. 7. As can be seen, the longitudinal axes of male and female sections 34 and 36 are positioned at an angle substantially less than 90° with respect to one another. Because of the relative positioning of elongated apertures 48 and 60 of female section 36, male section 34 can be inserted into and extend through female section 36. Importantly, it should be noted that male section 34 cannot be disconnected from female section 36 while the respective sections are disposed in this angular position. Disconnection is prevented since the endwall and beveled corner of second transversely extending notch 44 abut against segment 62 of female section 36. This configuration prevents inadvertent unlatching of connector 20, thus requiring an operator's effort to disassemble the connector.

As shown in FIG. 8, as the longitudinal axis of male section 34 is moved toward axial alignment with female section 36, tip 54 of elongated bar 38 is received in elongated aperture 60. Again, because of the constricted path defined by transversely extending segments 50 and 62 of female section 36, male section 34 cannot become disconnected while sections 34 and 36 are relatively positioned as shown in FIG. 8.

FIG. 9 shows connector 20 of the present invention in its fully connected position. As shown previously, the interfitting relationship between male section 34 and female section 36 allows the connector to form an essentially unitary body in its fully assembled position. Moreover, connector 20 is configured to lock rods 22 and 24 together for axial movement as a unit. This unitary locking construction advantageously transmits both axial and rotational forces through the connection along the longitudinal axis of the respective rods 22 and 24. With this construction, connector 20 transmits a greater amount of torque about the longitudinal axis of the elongated rods than can be transmitted with the use of existing rod coupler constructions.

It should also be appreciated that the elongated bar structure 38 of male section 34 is designed in the illustrated embodiment to maximize strength. As can be seen, elongated bar 38 is formed in offset sections, with each section mutually engaging one of the transversely extending segments of female section 36. Thus, elongated bar 38 is symmetrical across its entire body relative to a central axis, thereby providing strength against bending when lateral forces are applied to elongated rods 22 and 24. As such, connector 20 provides considerably greater strength than existing connectors for coupling rods.

As is evident from the foregoing description, the connector of the present invention provides numerous advantages over existing structures for coupling elongated rods. Specifically, the connector of the present invention is configured to transmit both axial and rotational forces from one rod to another such that the connected rods are locked together for axial movement as a unit when in axial alignment. The connector can be quickly and easily connected and disconnected by an operator and will not become inadvertently disconnected without an operator's effort. Moreover, because the connector of the present invention has substantially the same transverse dimension as the elongated rods when in axial alignment, the connector can be used in situations requiring smaller diameter sampling systems. Finally, the design of the connector is feasible to machine and cost-effective to produce.

Having described the invention, what is claimed is:

1. Structure for connecting a pair of elongated rods in axial alignment for transmitting axial and rotational forces along a longitudinal axis of the rods through the connection, said structure comprising:

interfitting male and female sections projecting in longitudinal extension from their corresponding respective rods:

the male section including an elongated transversely polygonal member which comprises an elongated transversely rectangular bar projecting from an end of the male section, said elongated transversely rectangular member having a transversely extending notch having endwalls presenting a pair of oppositely facing shoulders extending transversely of the corresponding elongated rod;

the female section comprising an elongated channel having a cross-section configuration for complementally receiving the male section for rotation with the latter and having a transversely extending segment configured to be received in the notch when the rods are in axial alignment to lack the rods together for axial movement as a unit;

the female section including a pair of elongated apertures respectively positioned on opposite facing surfaces of the channel relative to the longitudinal axis, the apertures communicating the channel with the exterior of the female section, the apertures being positioned to permit the sections to be moved into or removed from their connected positions when the rods are disposed in positions with their respective longitudinal axes at an angle with respect to one another; and wherein the elongated bar includes the transversely extending notch on one side, and a second transversely extending notch on an opposite side of the longitudinal axis from the one side and longitudinally offset from the first transversely extending notch.

2. Structure as defined in claim 1 wherein the elongated bar includes a plurality of beveled regions formed on select corners of the endwalls of the elongated bar and positioned to provide clearance when the interfitting sections are moved into axial alignment to lock the rods together and removed from their connected positions to separate the rods.

3. Structure as defined in claim 1 wherein a first one of the elongated apertures of the female section extends from one side of the transversely extending segment to the distal end of the female section configured to receive the male section.

4. Structure as defined in claim 3 wherein the second one of the elongated apertures is longitudinally offset from the first elongated aperture and positioned adjacent a second transversely extending segment disposed between the distal end of the female section and the second elongated aperture, the second transversely extending segment configured to be received in the second transversely extending notch of the male section when the rods are in axial alignment.

5. Structure as defined in claim 3 wherein the female section further includes an opening longitudinally aligned and spaced apart from the first elongated aperture and disposed on the other side of the first transversely extending segment, the opening communicating with the exterior of the female section and configured to receive the distal end of the male section bordering the first transversely extending notch when the rods are in axial alignment.

6. A connector for coupling a pair of elongated rods in axial alignment for transmitting axial and rotational forces through the connector along a longitudinal axis of the rods, the connector comprising;

a male connector member having an elongated bar extending from one end thereof and having a transversely extending notch on one side of the bar; and a female connector member having a cross-section configuration for mating with the male connector member, the female connector member having an elongated chamber defined by a pair of spaced apart sidewalls, the chamber having first and second elongated apertures communicating the chamber sidewalls with the exterior of the female member, said first aperture extending from one end of the female member to a transversely extending segment in the chamber, the second elongated aperture being longitudinally offset from and disposed on an opposite side of the chamber from the first elongated aperture such that the first and second apertures permit the connector members to be moved into or removed from their connected positions when the rods are disposed in positions with their respective longitudinal axes at an angle with respect to one another;

the transversely extending segment in the chamber being configured to engage the notch in the elongated bar when the rods are positioned in axial alignment to lock the rods together for the transmission of axial and rotational forces through the connector;

wherein the elongated bar is transversely rectangular in shape and includes the transversely extending notch on one side, and a second transversely extending notch on an opposite side of the longitudinal axis from the one side and longitudinally offset from the first transversely extending notch.

7. The connector as defined in claim 6 wherein the elongated bar includes a plurality of beveled regions formed on select corners of the elongated bar and positioned to provide clearance when the male and female connector members are moved into axial alignment to lock the rods together and removed from their connected positions to separate the rods.

8. The connector as defined in claim 6 wherein the female connector member includes a second transversely extending segment in the elongated chamber disposed between the distal end of the female member and the second elongated aperture, the second transversely extending segment configured to be received in the second transversely extending notch of the elongated bar when the rods are in axial alignment.

\* \* \* \* \*